United States Patent
Huck

(10) Patent No.: US 7,735,364 B2
(45) Date of Patent: *Jun. 15, 2010

(54) THERMAL MASS FLOW METER AND METHOD FOR ITS OPERATION

(75) Inventor: Ralf Huck, Großkrotzenburg (DE)

(73) Assignee: ABB AG, Mannheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/153,516

(22) Filed: May 20, 2008

(65) Prior Publication Data

US 2008/0289412 A1 Nov. 27, 2008

(30) Foreign Application Priority Data

May 21, 2007 (DE) .................. 10 2007 023 823

(51) Int. Cl.
*G01F 1/68* (2006.01)
(52) U.S. Cl. .................................................. 73/204.11
(58) Field of Classification Search ............. None
See application file for complete search history.

(56) References Cited

U.S. PATENT DOCUMENTS

| | | | | |
|---|---|---|---|---|
| 4,651,564 A | | 3/1987 | Johnson et al. | |
| 4,787,251 A | * | 11/1988 | Kolodjski | 73/755 |
| 5,119,674 A | * | 6/1992 | Nielsen | 73/204.24 |
| 5,339,687 A | * | 8/1994 | Gimson et al. | 73/204.19 |
| 5,809,827 A | * | 9/1998 | Kurisaki et al. | 73/204.17 |
| 5,869,758 A | * | 2/1999 | Huiberts | 73/197 |
| 5,880,365 A | | 3/1999 | Olin et al. | |
| 6,023,969 A | * | 2/2000 | Feller | 73/204.25 |
| 6,536,273 B2 | * | 3/2003 | Schrittenlacher | 73/204.11 |
| 6,553,827 B2 | * | 4/2003 | McCormick | 73/196 |
| 6,681,625 B1 | * | 1/2004 | Berkcan et al. | 73/204.23 |
| 6,703,241 B1 | * | 3/2004 | Sunshine et al. | 73/23.21 |
| 2008/0289411 A1 | * | 11/2008 | Schrag et al. | 73/204.11 |

FOREIGN PATENT DOCUMENTS

| | | |
|---|---|---|
| DE | 10 2004 058 553 A1 | 6/2006 |
| DE | 10 2005 038 538 A1 | 2/2007 |
| DE | 10 2005 057 687 A1 | 6/2007 |

* cited by examiner

*Primary Examiner*—Harshad Patel
(74) *Attorney, Agent, or Firm*—Buchanan Ingersoll & Rooney PC

(57) ABSTRACT

A thermal mass flow meter is disclosed for determining a material flow through a vessel. In this case, a sensor arrangement is mounted on a holder immersed into a vessel with a flowing medium. It is proposed that the sensor arrangement comprises a first and a second measuring element, with one of the respective measuring elements being heated while the other respective measuring element is not heated and that the two measuring elements can be heated alternately.

12 Claims, 1 Drawing Sheet

THERMAL MASS FLOW METER AND METHOD FOR ITS OPERATION

RELATED APPLICATION

This application claims priority under 35 U.S.C. §119 to German Patent Application No. 10 2007 023 823.3 filed in Germany on May 21, 2007, the entire content of which is hereby incorporated by reference in its entirety.

TECHNICAL FIELD

The disclosure relates to a thermal mass flow meter for determining a material flow through a vessel and to a method for its operation.

BACKGROUND INFORMATION

Such mass flow meters have long been known. The measuring principle of thermal mass flow meters is based on the cooling of a heating element mounted on a holder when immersed into a flowing fluid. The flow which flows over the surface of the heating element absorbs heat from the latter and thus cools the heating element. The construction and behavior are illustrated in principle in FIG. 1. In this case, the quantity of heat absorbed by the flow depends on the temperature difference between the surface and the fluid, and on the flow itself. It can be described by a function $$\dot{q} = \alpha(T_O - T_F),$$

where $\dot{q}$ is the quantity of heat dissipated, $(T_O - T_F)$ is the temperature difference, and $\alpha$ is a constant of proportionality.

The constant of proportionality $\alpha$ is in this case directly dependent on the flow and is a function of the mass flow density over the heating element $\alpha = f(\rho v) \sim \sqrt{\rho v}$. Now, if the temperature difference between the surface and the fluid, and also the heating power required to generate this temperature difference, are known, the mass flow over the heating element can thus be determined from this.

Thus, for practical application of such a thermal mass flow measurement, two temperature sensors, one of which is heated and used for the flow measurement, are now put into the flow as illustrated in FIG. 2. The second temperature sensor serves to measure the fluid temperature $T_F$.

In general, the measurement is in this case carried out only statically with a constant heating power or a constant temperature difference between the heater and the flow. However, a pulsed mode of operation, which is evaluated with slightly more effort, could also be carried out in this case.

However, for all these measurements here it is important that a very accurate measurement of the heating power and the temperature difference is carried out. The quantity of heat given off to the flow cannot be measured directly in this case but is rather determined by measuring the electrical heating power used. However, due to the construction, the electrical heating power introduced is not completely given off to the flow directly from the sensor head but a part of the heat flows into the holder of the sensor head and from there it is given off to the surroundings or to the flow at a greater distance from the measuring element. Since this heat flux is included in the measurement of the mass flow, it directly influences the measured result and presents a great source of error when using a thermal mass flow meter. It is partially taken into consideration during the calibration of the mass flow meter. However, since it is very variable, depending in particular on the flow and temperature conditions in the flow, it can be considered only to a limited extent during calibration and thus still presents a great source of error. It is thus attempted to keep this heat-loss flux as low as possible during the development of a thermal mass flow meter in order to achieve a flow measurement that is as accurate as possible.

In order to reduce this influence, it is generally attempted to set the ratio of the direct heat flux into the flow and the losses into the holder to be as great as possible during the development of a thermal mass flow meter. That is to say, a very good thermal contact between the heater and the flow is created and, at the same time, the heat outflow into the holder is reduced by appropriate insulation. A possible embodiment is presented in U.S. Pat. No. 5,880,365. In general, the insulation in this case comprises the entire holder of the sensor head in order to create the best insulation possible.

The quantity of heat given off to the flow is a measure of the flow. If the correlation of quantity of heat given off to the flow directly via the sensor and indirectly via the holder is constant, a unique relationship between the quantity of heat and the mass flow can be determined by calibration. In this case, it is assumed that the heat-loss flux given off by the sensor and holder only depends on the flow and the construction of the sensor itself.

However, in real process conditions, the assumption of a constant correlation between quantities of heat given off directly and indirectly to the flow, depending only on the flow, proves to be false. The main cause of this error is contamination of the flow medium, which is deposited on the surfaces of the sensor and holder and thus leads to a change in the heat transfers. By way of example, if the heat transfer between the sensor and the gas deteriorates, the supplied quantity of heat dissipated via the holder is increased. The correlation between quantities of heat given off by the sensor and the holder found during calibration is changed due to the contamination.

The contamination is thus an unwanted effect which falsifies the calibration data and hence the measurement. Since the contamination of the sensor head cannot be detected, this results in dangerous falsified measured values.

The contaminated mass meter will show a measured value that is too low due to the heat losses into the holder. There is the danger of overfilling in filling processes. In the case of billing, a value that is too low is calculated.

Although the problem can be countered by frequent recalibrations, which are often complex, the sensor must be removed for these. Disadvantageously, the process has to be suspended for this purpose. Since the time of de-calibration due to contamination cannot be anticipated, calibration must be performed, often unnecessarily, at short time intervals. Calibration "on demand" is not possible.

In addition, in situ monitoring with a second, independent sensor is known. However, since both sensors are subject to the same contamination, parallel drift occurs, so that once again the error cannot be detected. Furthermore, installation and service costs are considerably increased by redundant sensor systems.

SUMMARY

The disclosure is therefore based on the object of reliably detecting the drift of the known thermal mass flow meter without suspending the process.

A thermal mass flow meter is disclosed with at least one sensor arrangement which is mounted on a holder and immersed into a vessel with a flowing medium, wherein the sensor arrangement comprises a first and a second measuring element, with one of the respective measuring elements being heated while the other respective measuring element is not heated and wherein the two measuring elements can be heated alternately.

A method for operating a thermal mass flow meter is disclosed with at least one sensor arrangement which is mounted on a holder and immersed into a vessel with a flowing medium, wherein the flow is measured by two measuring elements which are alternately heated intermittently, the measured values of the measuring elements are intermittently compared to one another, and the deviations between the measured values of the measuring elements in successive phases are detected as a change of the measuring elements.

Yet, in another aspect, a sensor arrangement is disclosed, mounted on a holder immersible into a vessel having a flowing medium for thermal mass flow measurement. The mounted sensor arrangement comprises a first measuring element; a second measuring element; and a holder for mounting the measuring elements, wherein one of the measuring elements is heated while the other of the measuring elements is not heated.

BRIEF DESCRIPTION OF THE DRAWINGS

The disclosure is explained in more detail below with reference to an exemplary embodiment. The drawings required for this show the following.

DETAILED DESCRIPTION

In order to increase the measurement reliability of the measuring method without the restrictions described above, it is proposed to detect the contamination by alternating comparison of the measured results from two modes of operation of the same sensor system with the measuring elements A and B, and to ensure a differing contamination rate of the measuring elements, and thus differing effects on the modes of operation, by suitable constructional and/or metrological measures.

The determination of the flow is optionally carried out by means of the known methods for determining excess temperature in the case of constant heating power or determining power in the case of constant excess temperature. The detection of contamination can be carried out at a constant flow. In this way, measuring errors due to the dynamics in the flow are avoided.

In a first exemplary mode of operation, measuring element A is heated and measuring element B is used to determine the temperature of the medium.

In a second exemplary mode of operation, measuring element B is heated and measuring element A is used to determine the temperature of the medium.

The sensor system is alternately operated in both modes of operation and the measured results determined are compared to another in the process. As long as the measured results are equal, the sensor system is considered to be uninfluenced by contamination. If the measured results differ, interference has occurred.

The mass flow meter is calibrated in both modes of operation. Without contamination, the value of the difference between the measured values determined by the first and second modes of operation is equal to or smaller than the measuring inaccuracy. If unequal contamination of the measuring elements A and B occurs due to the measures described above, then this will have a differing influence on the measured values of the two modes of operation. The contamination is thus reliably detected. If the deviation exceeds a freely selectable threshold value, an "on demand" recalibration can be initiated.

So that rapidly changing flows cannot likewise lead to a difference in the measurement in the two modes of operation, the measured-value deviation must only be evaluated at almost constant flow.

Figure 1:
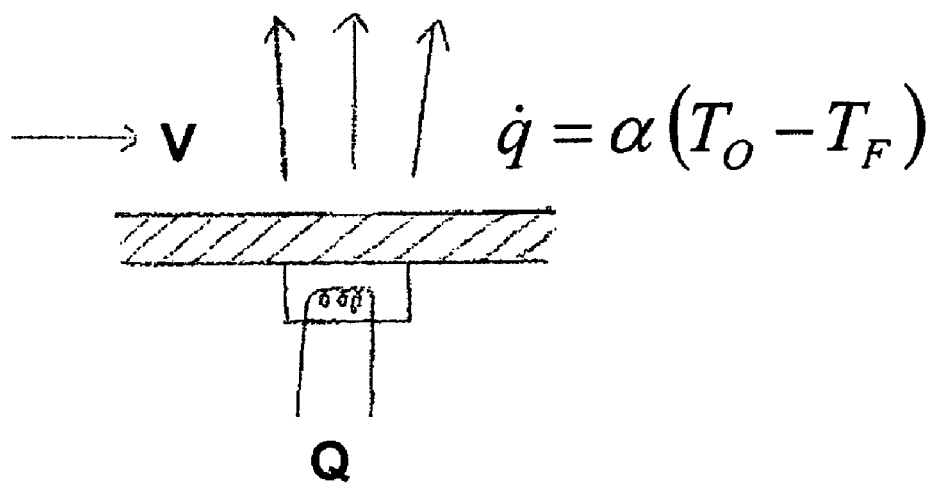
FIG. 1 shows an illustration of the principle of an exemplary thermal mass flow meter.
Figure 2:
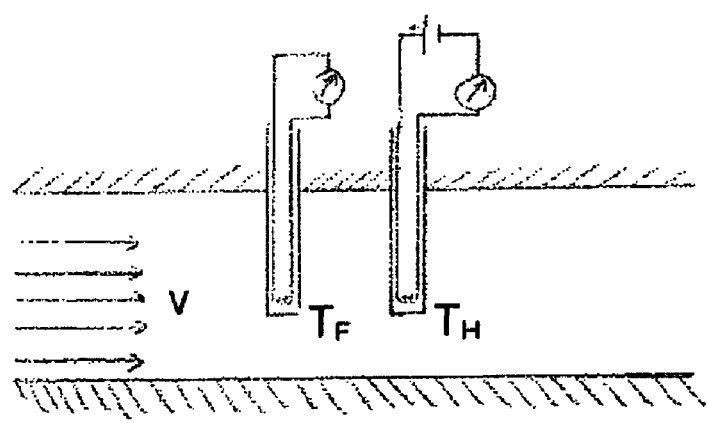
FIG. 2 shows an illustration of the principle of an exemplary measuring arrangement.

FIG. 2 illustrates the principle of an exemplary measuring arrangement with two measuring elements. One of the measuring elements is heated during operation.

In an exemplary refinement of the disclosure, different flow guides are provided for the measuring elements. In this manner, a differing deposition behavior of dirt particles is achieved on the two measuring elements by means of a differing flow.

In another exemplary embodiment of the disclosure, it is provided that the duty cycle of the two modes of operation is asymmetrical. Heated measuring elements cause the damp dirt to dry and this leads to a different rate of contamination of the two measuring elements, since damp and dried dirt adhere to the measuring elements to a different degree. A differing deposition behavior of dirt particles on the two measuring elements is achieved by means of an asymmetrical duty cycle of the modes of operation.

In a further exemplary embodiment of the disclosure, it is provided that the surface finish is designed differently for the two measuring elements. In this case, it can be provided to vary the roughness of the surfaces of the measuring elements. Alternatively, it can be provided to provide the surfaces of one of the measuring elements with a non-stick coating and achieve a differing deposition behavior of dirt particles on the two measuring elements in this way.

Furthermore it can be provided to combine a plurality of the measures mentioned above with another in order to bring about a differing deposition behavior of dirt particles.

In any case, the differing deposition behavior of dirt particles on the two measuring elements leads to a detectable measured value difference.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A thermal mass flow meter with at least one sensor arrangement which is mounted on a holder and immersed into a vessel with a flowing medium,
    wherein
    the sensor arrangement comprises a first and a second measuring element, with one of the respective measuring elements being heated while the other respective measuring element is not heated and wherein the two measuring elements can be heated alternately.

2. The mass flow meter as claimed in claim 1, wherein the flow of the medium is guided differently at the measuring elements.

3. The mass flow meter as claimed in claim 2, wherein the duty cycle of the two modes of operation is asymmetrical.

4. The mass flow meter as claimed in claim 1, wherein the duty cycle of the two modes of operation is asymmetrical.

5. The mass flow meter as claimed in claim 4, wherein the two measuring elements have different surface finishes.

6. The mass flow meter as claimed in claim 1, wherein the two measuring elements have different surface finishes.

7. The mass flow meter as claimed in claim 6, wherein the surfaces of one of the measuring elements are provided with a non-stick coating.

8. The mass flow meter as claimed in claim 6, wherein the roughness of the surfaces of the measuring elements differs.

9. A method for operating a thermal mass flow meter with at least one sensor arrangement which is mounted on a holder and immersed into a vessel with a flowing medium, wherein
the flow is measured by two measuring elements which are alternately heated intermittently,
the measured values of the measuring elements are intermittently compared to one another, and
the deviations between the measured values of the measuring elements in successive phases are detected as a change of the measuring elements.

10. The method as claimed in claim 9, wherein the deviations between the measured values of the measuring elements in successive phases are only evaluated in the case of an almost constant flow.

11. A sensor arrangement mounted on a holder immersible into a vessel having a flowing medium for thermal mass flow measurement, the mounted sensor arrangement comprising:
a first measuring element;
a second measuring element; and
a holder for mounting the measuring elements,
wherein one of the measuring elements is heated while the other of the measuring elements is not heated.

12. The sensor arrangement as claimed in claim 11, wherein the two measuring elements can be heated alternately.

* * * * *